US010750045B2

(12) United States Patent
Chimura

(10) Patent No.: US 10,750,045 B2
(45) Date of Patent: Aug. 18, 2020

(54) ELECTRONIC DEVICE AND METHOD FOR CONTROLLING MEMORY THEREOF

(71) Applicant: KYOCERA Document Solutions Inc., Osaka (JP)

(72) Inventor: Tetsuyuki Chimura, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 16/534,842

(22) Filed: Aug. 7, 2019

(65) Prior Publication Data
US 2020/0068086 A1 Feb. 27, 2020

(30) Foreign Application Priority Data
Aug. 21, 2018 (JP) .................. 2018-154893

(51) Int. Cl.
*G06F 12/06* (2006.01)
*H04N 1/00* (2006.01)
*H04L 12/28* (2006.01)

(52) U.S. Cl.
CPC ..... *H04N 1/00954* (2013.01); *G06F 12/0646* (2013.01); *H04N 1/00474* (2013.01); *G06F 2212/172* (2013.01); *H04L 12/28* (2013.01); *H04N 2201/0094* (2013.01)

(58) Field of Classification Search
CPC .......... G06F 12/0646; G06F 2212/172; H04L 12/28; H04N 1/00474; H04N 1/00954; H04N 2201/0094

USPC ................................. 358/1.11–1.18
See application file for complete search history.

(56) References Cited

U.S. PATENT DOCUMENTS

| 2006/0004977 | A1* | 1/2006 | Jann | G06F 12/023 |
| | | | | 711/170 |
| 2015/0293736 | A1* | 10/2015 | Chimura | G06F 12/02 |
| | | | | 358/1.17 |

FOREIGN PATENT DOCUMENTS

| JP | 2011-250210 | A | | 12/2011 |
| JP | 2011250210 | A | * | 12/2011 |
| JP | 2016192011 | A | * | 11/2016 |
| JP | 2019036905 | A | * | 3/2019 |

* cited by examiner

*Primary Examiner* — Chad Dickerson
(74) *Attorney, Agent, or Firm* — Stein IP, LLC

(57) ABSTRACT

An electronic device includes a memory, a mode configuration management portion, a panel portion, and a memory management portion. The mode configuration management portion configures a plurality of allocation modes for allocating a plurality of areas to the memory. The panel portion displays a mode selection screen for selecting one of the allocation modes. The memory management portion allocates the plurality of areas to the memory based on the selected one of the allocation modes. The mode configuration management portion manages a plurality of recommended modes. The memory management portion sets sizes of an input portion and an output portion of the respective areas according to the recommended mode selected by the mode configuration management portion.

4 Claims, 7 Drawing Sheets

FIG.4B

| | RECOMMENDED MODE (A) | RECOMMENDED MODE (B) | RECOMMENDED MODE (C) | RECOMMENDED MODE (D) | RECOMMENDED MODE (E) | RECOMMENDED MODE (F) | RECOMMENDED MODE (G) |
|---|---|---|---|---|---|---|---|
| INPUT PORTION | 10 M B | 11.25 M B | 12.5 M B | 13.75 M B | 15 M B | 16.25 M B | 17.5 M B |
| OUTPUT PORTION | 15 M B | 13.75 M B | 12.5 M B | 11.25 M B | 10 M B | 8.75 M B | 7.5 M B |

FIG.4C

| | RECOMMENDED MODE (A) 411 | RECOMMENDED MODE (B) 412 | RECOMMENDED MODE (C) 413 | RECOMMENDED MODE (D) 414 | RECOMMENDED MODE (E) 415 | RECOMMENDED MODE (F) 416 | RECOMMENDED MODE (G) 417 |
|---|---|---|---|---|---|---|---|
| FREE-SPACE WAIT TIME 420a | 10 | 20 | 10 | 20 | 10 | 7 | 10 |
| | 5 | 5 | 10 | 5 | 10 | — | 3 |
| | 20 | 10 | 10 | 4 | 6 | — | — |
| AVERAGE FREE-SPACE WAIT TIME 420b | 12.5 | 11.66 | 10 | 9.66 | 8.66 | 7 | 6.5 |
| (IN SECONDS) | (1) | (2) | (3) | (4) | (5) | (6) | (7) |

420

ELECTRONIC DEVICE AND METHOD FOR CONTROLLING MEMORY THEREOF

INCORPORATION BY REFERENCE

This application is based upon and claims the benefit of priority from the corresponding Japanese Patent Application No. 2018-154893 filed on Aug. 21, 2018. The entire contents of which are incorporated herein by reference.

BACKGROUND

The present disclosure relates to an electronic device incorporating a memory and a method for controlling a memory in an electronic device.

For example, image forming apparatuses such as MFPs (multifunction peripherals), which are a kind of electronic device, have models incorporating a printing function, a copying function, a FAX (facsimile) function, a scanning function, a network data transmission/reception function, and the like. In image forming apparatuses incorporating these functions, efficient use of the memory for image processing helps enhance performance in various jobs.

SUMMARY

According to one aspect of what is disclosed herein, an electronic device includes a memory, a mode configuration management portion, a panel portion, and a memory management portion. The mode configuration management portion configures a plurality of allocation modes for allocating a plurality of areas to the memory. The panel portion displays a mode selection screen for selecting one of the plurality of allocation modes. The memory management portion allocates the plurality of areas to the memory based on one of the allocation modes selected on the mode selection screen. The plurality of areas are used for different functions respectively. The memory management portion, after allocating the plurality of areas to the memory based on one of the allocation modes selected on the mode selection screen, acquires the free-space wait times for the respective areas. The mode configuration management portion manages a plurality of recommended modes which set sizes of an input portion and an output portion of the respective areas allocated to the memory according to the average free-space wait times and selects one of the recommended modes for the respective areas based on the average free-space wait times calculated from the free-space wait times acquired by the memory management portion. The memory management portion sets the sizes of the input portion and the output portion of the respective areas according to the recommended mode selected by the mode configuration management portion.

According to another aspect of what is disclosed herein, a method for controlling a memory in an electronic device includes configuring, by a mode configuration management portion, a plurality of allocation modes indicating allocation of a plurality of areas in the memory; displaying, by a panel portion, a mode selection screen for selecting one of the plurality of allocation modes; and allocating, by a memory management portion, the plurality of areas to the memory based on one of the allocation modes selected on the mode selection screen. The plurality of areas are used for different functions respectively. The memory management portion, after allocating the plurality of areas to the memory based on one of the allocation modes selected on the mode selection screen, acquires the free-space wait times for the respective areas. The mode configuration management portion manages a plurality of recommended modes which set sizes of an input portion and an output portion of the respective areas allocated to the memory according to the average free-space wait times and selects one of the recommended modes for the respective areas based on the average free-space wait times calculated from the free-space wait times acquired by the memory management portion. The memory management portion sets the sizes of the input portion and the output portion of the respective areas according to the recommended mode selected by the mode configuration management portion.

This and other objects of the present disclosure, and the specific benefits obtained according to the present disclosure, will become apparent from the description of embodiments which follows.

BRIEF DESCRIPTION OF THE DRAWINGS

FIG. 4B is a diagram illustrating a mode management table for managing various recommended modes which set the input portion and the output portion of an area allocated for each function in the memory;

FIG. 4C is a diagram illustrating a selection condition management table for managing selection conditions for the recommended modes shown in FIG. 4B.

DETAILED DESCRIPTION

One embodiment of an electronic device according to the present disclosure will be described below with reference to FIGS. 1 to 5. The following description assumes, as one example of the electronic device, an MFP (multifunction peripheral) incorporating, for example, a printing function, a copying function, a FAX (facsimile) function, a scanning function, a network data transmission/reception function, and the like.

Figure 1:
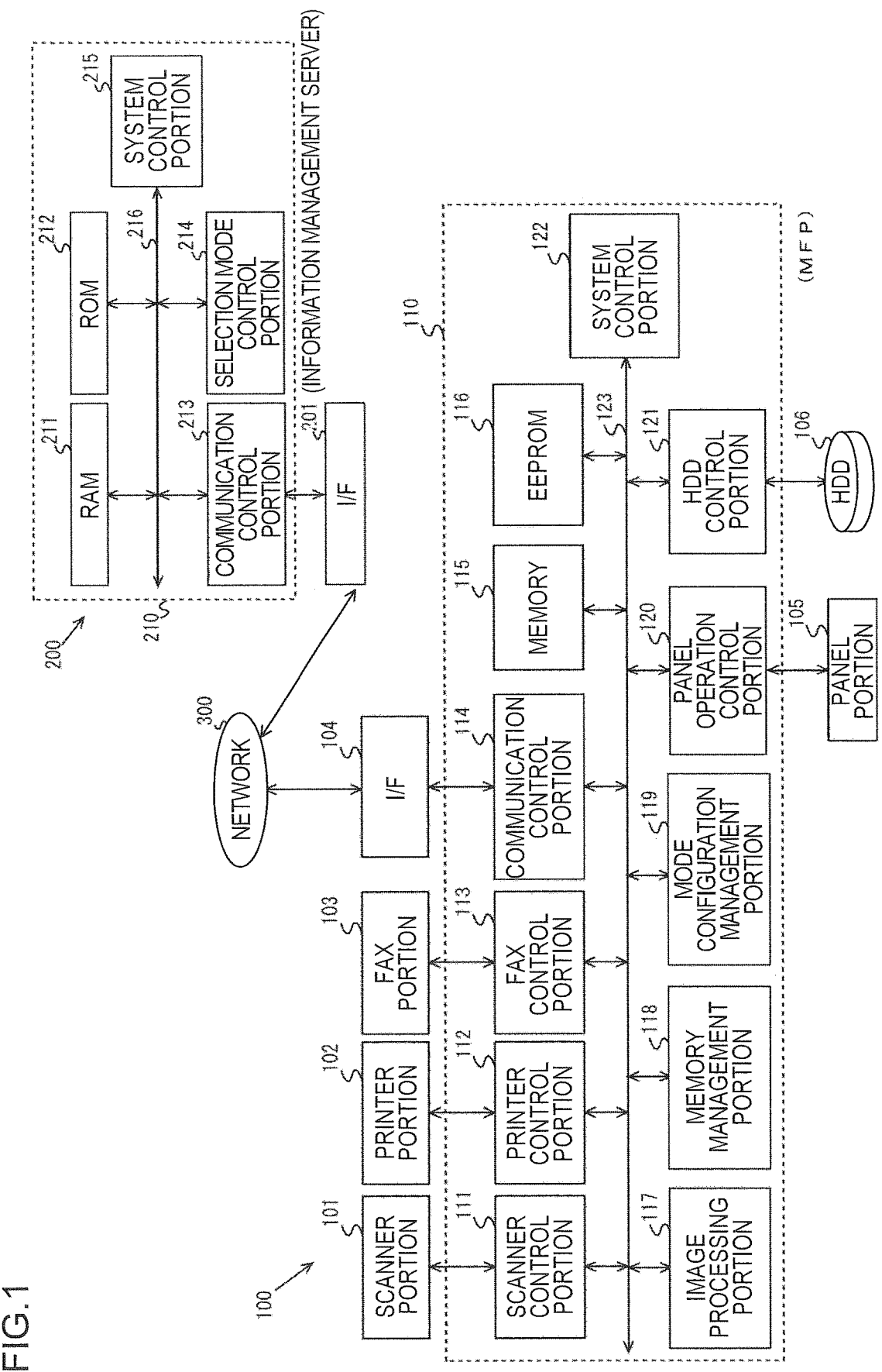
FIG. 1 is a diagram illustrating one embodiment where an electronic device of the present disclosure is applied to an MFP.

As shown in FIG. 1, an MFP 100 is connected to an information management server 200 via a network 300 such as a LAN (local area network) or the Internet.

FIG. 1 shows a case where one MFP 100 is connected to the information management server 200 via the network 300. However, a plurality of MFPs may be connected to the information management server 200 via the network 300. In this case, the plurality of MFPs include the MFP 100 and at least one other unillustrated MFP, and may include a plurality of MFPs 100 of the same model.

Moreover, any other unillustrated terminal may be connected to the MFP 100 and the information management server 200 via the network 300. That other unillustrated terminal is, for example, a PC (personal computer) or a smartphone.

A cloud server may be used as the information management server 200.

The MFP 100 may communicate with an unillustrated content server, a web server, or the like.

The MFP 100 includes a control portion 110 which controls the operation of a scanner portion 101, a printer portion 102, a FAX (facsimile) portion 103, an I/F (interface) 104, a panel portion 105, and an HDD (hard disk drive) 106.

The scanner portion 101 is a device which converts an image on an unillustrated sheet read by an image sensor (unillustrated) into digital image data and which then feeds it to the control portion 110.

The printer portion 102 is a device which prints an image on an unillustrated sheet based on printing data fed from the control portion 110.

The FAX portion 103 is a device which transmits data fed from the control portion 110 to a facsimile machine on the other side of a telephone line and which receives data from the other-side facsimile machine to feed it to the control portion 110.

The I/F 104 serves to communicate, via the network, with the information management server 200, any other unillustrated MFP, any other unillustrated terminal, an unillustrated content server or web server, and the like.

Figure 2:
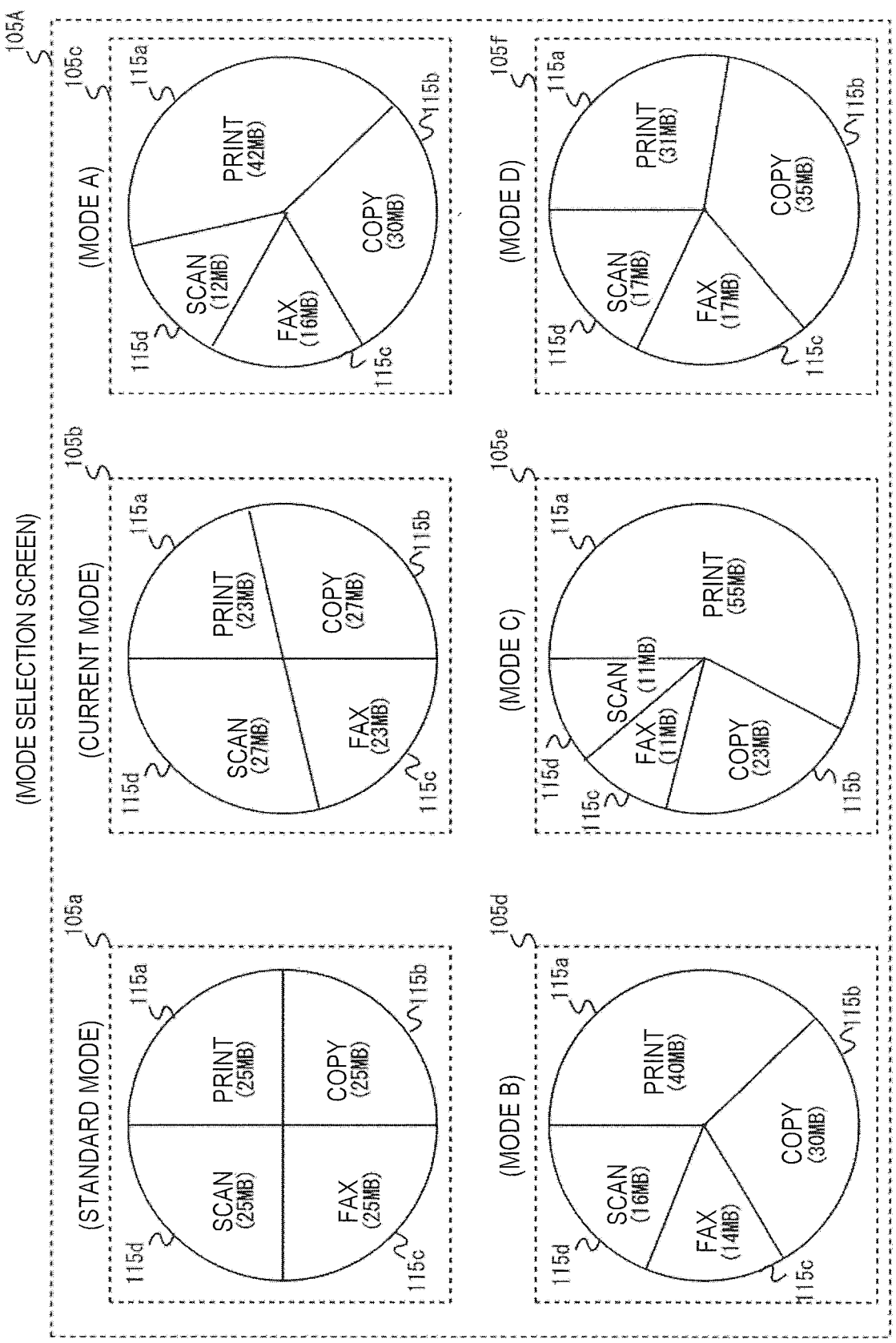
FIG. 2 is a diagram illustrating one example of a mode selection screen displayed on a panel portion shown in FIG. 1.

The panel portion 105 is a device having a touch panel and hardware keys for display related to, for example, the printing function, copying function, FAX function, scanner function, network data transmission/reception function, and various kinds of setting for the MFP 100. Moreover, the panel portion 105 displays a mode selection screen 105A as shown in FIG. 2, which will be described later.

The HDD 106 is a storage device which stores application programs and the like for carrying out various functions of the MFP 100. The HDD 106 has a user box for storing a printing job registered from the side of an unillustrated terminal.

The control portion 110 is a processor for controlling the operation of the entire MFP 100 by performing an application program such as an authentication program and the like, an image forming program, a control program, and the like. The control portion 110 includes a scanner control portion 111, a printer control portion 112, a FAX control portion 113, a communication control portion 114, a memory 115, an EEPROM (electrically erasable and programmable read-only memory) 116, an image processing portion 117, a memory management portion 118, a mode configuration management portion 119, a panel operation control portion 120, an HDD control portion 121, and a system control portion 122. These are connected to a data bus 123.

The scanner control portion 111 controls reading operation by the scanner portion 101. The printer control portion 112 controls printing operation by the printer portion 102.

The FAX control portion 113 controls data transmitting/receiving operation by the FAX portion 103.

The communication control portion 114 controls, through the I/F 104, transmission/reception of data and the like via a network.

The memory 115, such as a RAM, is used for performing a program. A plurality of areas such as areas 115a to 115d are allocated in the memory 115 by the memory management portion 118 (see FIGS. 2, 3A, and 3B). The areas 115a to 115d are function-specific areas.

The area 115a is an area in the memory 115 suitable for use for the printing function.

The area 115b is an area in the memory 115 suitable for use for the copying function.

The area 115c is an area in the memory 115 suitable for use for the FAX function.

The area 115d is an area in the memory 115 suitable for use for the scanning function.

As will be described later, a plurality of allocation modes are set for determining the areas 115a to 115d. For example, as shown in FIG. 2, standard mode, current mode, mode A, mode B, mode C, and mode D are set as allocation modes. A user can select one of these allocation modes. The areas 115a to 115d are determined according to the selected allocation mode. The memory 115 will be described in detail later.

In the EEPROM 116, a control program and the like for operation checking and start-up sequence generation for different portions are stored. Also stored in the EEPROM 116 are, for example, the use history of each of the printing function, the copying function, the FAX function, and the scanning function, the use frequency of each area of the memory 115, the free-space wait time 420a for the memory 115, and the like.

Incidentally, the use history of each of the printing function, the copying function, the FAX function, and the scanning function, the use frequency of each area of the memory 115, the free-space wait time 420a of the memory 115, and the like may be stored in the HDD 106 instead of the EEPROM 116.

The use frequency of each area of the memory 115 is, assuming that the sum of the respective use histories of, for example, the printing function, the copying function, the FAX function, and the scanning function equals a given value (for example 100), the number of times of use, out of that value, of each area of the memory 115 by each function. Thus, the use frequency of each area of the memory 115 can be determined from the use history of each function stored in the EEPROM 116.

The given value can be a value smaller than 100 or larger than 100. The sum of the respective use histories of the different functions may be calculated, instead of using a given value, for every given period (for example, every month, every three months, or every six months).

The free-space wait time 420a for the memory 115 is a wait time based on processing in the areas 115a to 115d in the memory 115 allocated to different functions. The free-space wait time 420a for the memory 115 will be described in detail later.

The image processing portion 117 performs image processing (rasterization) on image data read by the scanner portion 101. The image processing portion 117 performs image processing (rasterization) on a printing job registered in the user box in the HDD 106. The system control portion 122 makes the memory 115 store, for a while, printing data which has undergone image processing by the image processing portion 117.

The memory management portion 118, according to an instruction from the system control portion 122, performs allocation of the areas 115a to 115d of the memory 115. The memory management portion 118 will be described in detail later.

The mode configuration management portion 119 manages a mode management table 410 shown in the FIG. 4B and described later and a selection condition management table 420 shown in FIG. 4C and described later.

The mode configuration management portion 119 manages device information showing unique identification information such as a model name and a serial number processed in a mode selected by a user, the type of the performed job, and the free-space wait time 420a for the memory 115 during the job.

The mode configuration management portion 119 determines the average free-space wait time 420b in the selection condition management table 420 shown in FIG. 4C and described later and selects one, which suits the average free-space wait time 420b, of a plurality of recommended modes (recommended modes (A) to (G)) shown in FIG. 4B and described later.

The mode configuration management portion 119 configures and manages the mode selection screen 105A shown in FIG. 2 and described later.

The mode configuration management portion 119 will be described in detail later.

The panel operation control portion 120 controls the display operation of the panel portion 105. The panel operation control portion 120, via the panel portion 105, accepts settings for printing, copying, FAX, scanning, network data transmission/reception, or the like. The panel operation control portion 120, via the panel portion 105, accepts mode selection.

The HDD control portion 121 controls data reading and writing and the like with respect to the HDD 106.

The system control portion 122 controls coordinated operation and the like of different portions.

Moreover, the system control portion 122, when the panel operation control portion 120 accepts mode selection via the panel portion 105, requests the memory management portion 118 to perform allocation of the areas 115a to 115d of the memory 115.

The system control portion 122 makes the EEPROM 116 store, for example, the use history of each of the printing function, copying function, FAX function, and scanning function, the use frequency of each area of the memory 115, the free-space wait time 420a for the memory 115, and the like.

When the sum of the respective use histories of, for example, the printing function, the copying function, the FAX function, and the scanning function reaches a given value (for example, 100), the system control portion 122 makes the mode configuration management portion 119 configure a new mode. The sum of the use histories is not limited to 100. It may be smaller or larger than 100.

The system control portion 122 requests the memory management portion 118 to set the areas 115a to 115d allocated for different functions based on one of the recommended modes (A) to (G) 411 to 417 shown in FIG. 4B and described later that is selected by the mode configuration management portion 119.

The system control portion 122 will be described in detail later.

The MFP 100 transmits to the information management server 200 the allocation mode (one of standard mode, current mode, mode A, mode B, mode C, and mode D) selected by a user, the setting content in the areas 115a to 115d, and device information.

The setting content in the areas 115a to 115d represent settings for the input and output portions of the respective areas 115a to 115d in the selected allocation mode (one of standard mode, current mode, mode A, mode B, mode C, and mode D).

Figure 4A:
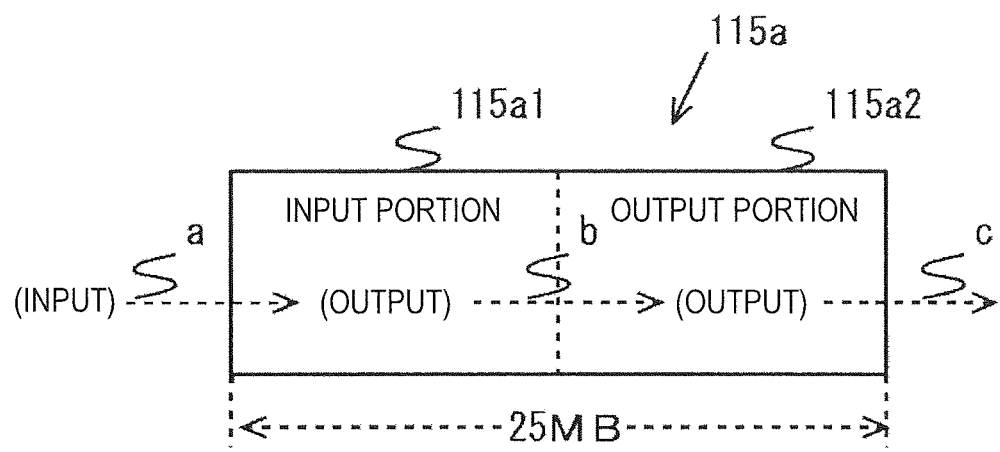
FIG. 4A is a diagram illustrating an input portion and an output portion of an area allocated for each function in the memory.

For example, as shown in FIG. 4A, the area 115a includes an input portion 115a1 and an output portion 115a2. As shown in FIGS. 4B and 4C, the respective sizes of the input and output portions 115a1 and 115a2 are set in accordance with one of the recommended modes (A) to (G) 411 to 417.

The sizes of the input portion and the output portion of the respective areas 115b, 115c, and 115d are similarly set.

For device information, unique identification information of the MFP 100 such as the model name or the serial number may be used.

The information management server 200 manages, in association with the unique identification information such as the model name and the serial number of the MFP 100 included in device information received from the MFP 100, the recommended mode described later as memory management information. The recommended mode indicates the size settings for the input portion and the output portion of the respective areas 115a to 115d according to the allocation mode (one of standard mode, current mode, mode A, mode B, mode C, and mode D).

The information management server 200 can, by transmitting the memory management information that it manages in response to a request from another MFP 100 of the same model, further improve job processing performance on that other MFP 100 of the same model.

The information management server 200 includes a control portion 210 for controlling the I/F (interface) 201.

The I/F 201 serves to communicate, via the network 300, with the MFP 100, any other unillustrated MFP, unillustrated terminal, or the like. That other unillustrated MFP may include any other MFP 100 of the same model.

The control portion 210 is a processor for controlling the operation of the entire information management server 200 by performing an application program, a control program, and the like. The control portion 210 is provided with a RAM 211, a ROM (read-only memory) 212, a communication control portion 213, a selection mode control portion 214, and a system control portion 215. Moreover, these are connected to a data bus 216.

A RAM 211 is used for executing a program. The ROM 212 stores a control program for operation checking for different portions.

The communication control portion 213, via the I/F 201, controls transmission/reception of data and the like via the network 300 between the MFP 100 and any other unillustrated MFP, any unillustrated terminal, or the like.

The selection mode control portion 214 manages the selected allocation mode (one of standard mode, current mode, mode A, mode B, mode C, and mode D) received from the MFP 100, the setting content in the areas 115a to 115d for the functions in the selected allocation mode (one of standard mode, current mode, mode A, mode B, mode C, and mode D), and device information. In this case, the selection mode control portion 214 manages such information in association with the unique identification information such as the model name and the serial number of the MFP 100 included in the device information.

The system control portion 215, upon receiving above-mentioned memory management information from the MFP 100 via the communication control portion 213, requests the selection mode control portion 214 to manage memory management information from the MFP 100.

The system control portion 215, upon receiving a request for memory management information from an other MFP 100, acquires memory management information managed by the selection mode control portion 214 via the selection mode control portion 214, and makes the communication control portion 213 transmit it to the MFP 100 that has issued the request. The memory management information transmitted by the communication control portion 213 is, for example, memory management information associated with the model name indicating the same model that is included in device information of the requesting MFP 100. When the model is the same, memory management information managed by the information management server 200 can be acquired, and thus job processing performance can be further improved and potential can be brought out automatically.

Next, with reference to FIG. 2, one example of the mode selection screen 105A displayed on the panel portion 105 will be described. The following description assumes that the size of the memory 115 is, for example, 100 MB (megabytes). (The size of the memory 115 may be smaller or larger than 100 MB.)

The plurality of allocation modes displayed on the mode selection screen 105A (current mode, mode A, mode B, mode C, and mode D, which will be discussed later) except for standard mode described later, are what the mode configuration management portion 119 configures based on an instruction from the system control portion 122 when the sum of the respective use histories of, for example, the printing function, the copying function, the FAX function, and the scanning function reaches a given value (for example, 100). The configuration of a new mode by the mode configuration management portion 119 will be described later with reference to FIGS. 3A and 3B.

First, the mode selection screen 105A displays a plurality of allocation modes, for example, standard mode, current mode, mode A, mode B, mode C, and mode D. The reference signs 105*a* to 105*f* represent the display areas of the respective modes. The reference signs 115*a* to 115*d* represent the areas for different functions allocated to the memory 115 by the memory management portion 118.

Standard mode is managed as a default by the mode configuration management portion 119. In standard mode, the size of each of the areas 115*a* to 115*d* for the respective functions allocated to the memory 115 by the memory management portion 118 is 25 MB.

Current mode indicates how the memory management portion 118 currently allocates the areas 115*a* to 115*d* to the memory 115. FIG. 2 shows an example where current mode is different from standard mode. In FIG. 2, current mode is selected from the allocation modes configured by the mode configuration management portion 119. In current mode, 23 MB is allocated to the area 115*a* for the printing function, 27 MB is allocated to the area 115*b* for the copying function, 23 MB is allocated to the area 115*c* for the FAX function, and 27 MB is allocated to the area 115*d* for the scanner function.

Modes A to D are, like current mode, the allocation modes configured by the mode configuration management portion 119. Modes A to D may be sorted new to old or old to new in order of configuration by the mode configuration management portion 119.

The number of allocation modes other than standard and current modes is not limited to four comprising modes A to D. Instead, it may be three or less or five or more.

Also, an upper limit may be set to the number of allocation modes which can be displayed or selected. When the number of allocation modes exceeds the upper limit, the mode configuration management portion 119 may delete the oldest allocation mode in the allocation modes except for standard mode and current mode.

According to what is shown, in mode A, 42 MB is allocated to the area 115*a* for the printing function, 30 MB is allocated to the area 115*b* for the copying function, 16 MB is allocated to the area 115*c* for the FAX function, and 12 MB is allocated to the area 115*d* for the scanner function.

In mode B, 40 MB is allocated to the area 115*a* for the printing function, 30 MB is allocated to the area 115*b* for the copying function, 14 MB is allocated to the area 115*c* for the FAX function, and 16 MB is allocated to the area 115*d* for the scanner function.

In mode C, 55 MB is allocated to the area 115*a* for the printing function, 23 MB is allocated to the area 115*b* for the copying function, 11 MB is allocated to the area 115*c* for the FAX function, and 11 MB is allocated to the area 115*d* for the scanner function.

In mode D, 31 MB is allocated to the area 115*a* for the printing function, 35 MB is allocated to the area 115*b* for the copying function, 17 MB is allocated to the area 115*c* for the FAX function, and 17 MB is allocated to the area 115*d* for the scanner function.

FIG. 2 shows a case where the MFP 100 has four functions comprising the printing function, the copying function, the FAX function, and the scanning function. When the MFP 100 has five or more functions, five or more areas are allocated to the memory 115. When the MFP 100 has three or less functions, three or less areas are allocated to the memory 115.

Next, with reference to FIGS. 3A and 3B, the configuration of a new mode by the mode configuration management portion 119 will be described. The following description deals with a case where, with the areas 115*a* to 115*d* allocated to the memory 115 in, for example, current mode shown in FIG. 2, when the sum of the use histories of the respective functions reaches 100, the mode configuration management portion 119 configures a new mode according to an instruction from the system control portion 122.

Figure 3A:
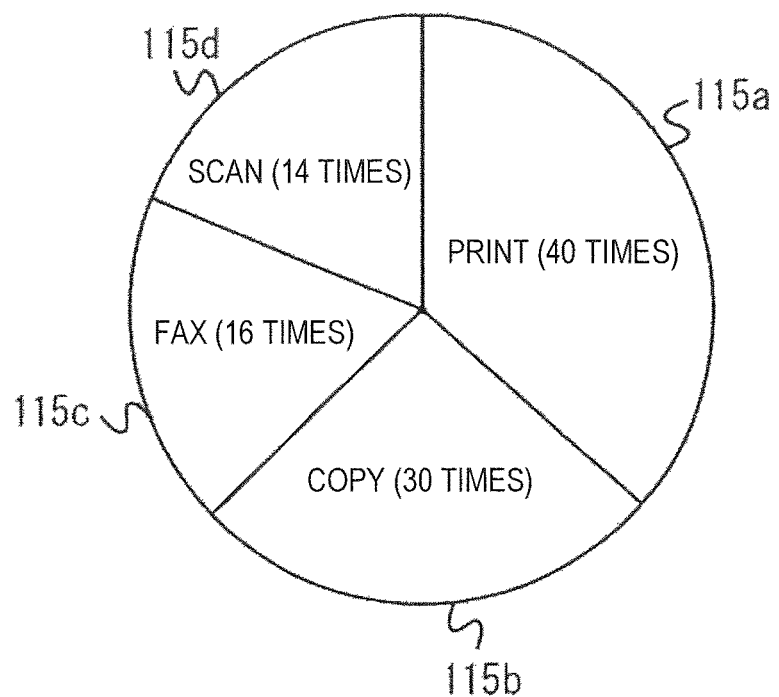
FIG. 3A is a diagram illustrating use frequencies, for different functions, of a memory.

First, FIG. 3A shows, for a case where the sum of the use histories for the respective functions has reached, for example, 100, one example of the use frequencies of the areas 115*a* to 115*d* (out of a total of 100 times of use). That is, it is assumed that the use frequency of the area 115*a* for the printing function is 40 times, the use frequency of the area 115*b* for the copying function is 30 times, the use frequency of the area 115*c* for the FAX function is 16 times, and the use frequency of the area 115*d* for the scanning function is 14 times.

Here, the mode configuration management portion 119 configures a new mode with new allocation of the areas 115*a* to 115*d* in the memory 115 based on the use frequencies of the respective areas 115*a* to 115*d*.

When the sum of the use histories of the respective functions reaches 100, the sum of the use histories of the respective functions is reset. That is, the mode configuration management portion 119, every time the sum of the use histories of the respective functions reaches 100, configures a new mode based on the use frequencies of the respective areas 115*a* to 115*d* out of those 100 times.

The mode configuration management portion 119, when determining new allocation of the areas 115*a* to 115*d* in the memory 115, may determine the new allocation in a ratio reflecting the use frequencies of the respective areas 115*a* to 115*d*. In this case, as shown in FIG. 3B, when the size of the memory 115 is, for example, 100 MB, the mode configuration management portion 119 can, based on the ratio reflecting the use frequencies of the respective areas 115*a* to 115*d*, configure a new mode such that 40 MB is allocated to the area 115*a* for the printing function, 30 MB is allocated to the area 115*b* for the copying function, 16 MB is allocated to the area 115*c* for the FAX function, and 14 MB is allocated to the area 115*d* for the scanning function.

The mode configuration management portion 119, as shown in FIG. 2, manages the configured new mode as, for example, one of modes A to D.

The mode configuration management portion 119 may calculate a ratio reflecting the use frequencies and then determine new allocation using the ratio modified by adding a part of the proportion of the area with the lowest use frequency to the proportion of the area with the highest use frequency. That is, allocation may be performed such that, for example, 42 MB is allocated to the area 115a with the highest use frequency and, for example, 12 MB is allocated to the area 115d with the lowest use frequency. In this way, enlarging the area 115a with the highest use frequency can further improve processing performance of, for example, a printing job.

Next, with reference to FIGS. 4A, 4B, and 4C, a description will be given of the setting, by the mode configuration management portion 119 of the MFP 100, of the areas 115a to 115d for the respective functions in the allocation mode (one of standard mode, current mode, mode A, mode B, mode C, and mode D) selected on the mode selection screen 105A in FIG. 2.

FIG. 4A shows the area 115a. The areas 115b, 115c, and 115d are similar to the area 115a. Thus, the area 115a will be taken as an example in the description below.

More specifically, the area 115a for the printing function in the memory 115 in standard mode will be taken as an example in the description below. There, it is assumed that the size of the area 115a for the printing function in standard mode is, for example, 25 MB.

As is understood from FIG. 2, in modes A, B, C, and D, the respective sizes of the area 115a for the printing function are larger than in standard mode and exceed 25 MB.

As shown in FIG. 4A, the area 115a includes an input portion 115a1 and an output portion 115a2.

When one of the allocation modes is selected, the memory management portion 118 first sets the sizes of the input portion 115a1 and the output portion 115a2 in a default mode.

For example, when standard mode is selected, the memory management portion 118 sets, in the default mode, the sizes of the input portion 115a1 and the output portion 115a2 both at 12.5 MB. This is merely an example of the sizes of the input portion 115a1 and the output portion 115a2 in the default mode when standard mode is selected. These sizes can be changed as necessary.

The sizes of the input portion 115a1 and the output portion 115a2 in the default mode may be different from one allocation mode to another. Thus, when another allocation mode is selected, in the default mode, the size of the input portion 115a1 does not necessarily need to be 12.5 MB, nor does the size of the output portion 115a2.

When, for example, a printing job is performed, the memory management portion 118 has printing data of a printing job entered in the input portion 115a1 as indicated by the dotted-line arrow a.

The image processing portion 117 performs image processing (rasterization) on the printing data entered in the input portion 115a1 to generate image data. The memory management portion 118 has the image data which has undergone image processing by the image processing portion 117 output to the output portion 115a2 as indicated by the dotted-line arrow b.

The image processing portion 117, based on an editing instruction included in the printing data, performs editing processing such as enlargement, reduction, and rotation on the image data to generate edited data. The memory management portion 118 makes the printer control portion 112 output the edited data from the output portion 115a2 as indicated by the dotted-line arrow c. Then, the printer control portion 112, based on the edited data, controls printing on an unillustrated sheet via the printer portion 102.

The memory management portion 118 manages the free-space wait time for the area 115a for the printing function. The free-space wait time includes, for example, the wait time until printing data is entered as indicated by the dotted-line arrow a, the wait time until image data is output as indicated by the dotted-line arrow b, and the wait time until the edited data is output as indicated by the dotted-line arrow c.

These wait times arise due to, for example, a delay in output that accompanies the image data processing indicated by the dotted-line arrow b and/or a delay in output that accompanies the edited data processing indicated by the dotted-line arrow c. In other words, for example, a delay in output that accompanies the image data processing indicated by the dotted-line arrow b and/or a delay in output that accompanies the edited data processing indicated by the dotted-line arrow c leads to a delay in the entry of printing data indicated by the dotted-line arrow a.

Thus, the memory management portion 118 can acquire the free-space wait time 420a based on the time consumed across one of the dotted-line arrows a to c. Incidentally, output after the image data processing indicated by the dotted-line arrow b involves no data editing, and thus it is predicted that the delay in output that accompanies the image data processing is small. By contrast, output after the edited data processing indicated by the dotted-line arrow c involves data editing, and thus it is predicted that the delay in output that accompanies the edited data processing is large.

Here, it is assumed that the memory management portion 118 acquires the free-space wait time 420a that accompanies, for example, the entry of printing data indicated by the dotted-line arrow a. In this case, the mode configuration management portion 119 registers the free-space wait time 420a acquired by the memory management portion 118 in the selection condition management table 420 shown in FIG. 4C.

The mode configuration management portion 119, when the memory management portion 118 acquires the free-space wait times 420a for the respective printing jobs, registers them, for example, as in the selection condition management table 420 shown in FIG. 4C.

In row (1), the free-space wait times 420a are 10 seconds, 5 seconds, and 20 seconds.

In row (2), the free-space wait times 420a are 20 seconds, 5 seconds, and 10 seconds.

In row (3), the free-space wait times 420a are 10 seconds, 10 seconds, and 10 seconds.

In row (4), the free-space wait times 420a are 20 seconds, 5 seconds, and 4 seconds.

In row (5), the free-space wait times 420a are 10 seconds, 10 seconds, and 6 seconds.

In row (6), the free-space wait time 420a is 7 seconds.

In row (7), the free-space wait times 420a are 10 seconds and 3 seconds.

The mode configuration management portion 119, when a given period passes, calculates the average free-space wait time 420b. The given period can be set freely. It can be one day, one week, or one month. In any case, it can be set freely according to the operating state of the MFP 100.

The mode configuration management portion 119 may calculate the average free-space wait time 420b, instead of every given period, when the number of acquired free-space wait times 420a reaches a given number.

In row (1), the average free-space wait time 420*b* is 12.5 seconds.

In row (2), the average free-space wait time 420*b* is 11.66 seconds.

In row (3), the average free-space wait time 420*b* is 10 seconds.

In row (4), the average free-space wait time 420*b* is 9.66 seconds.

In row (5), the average free-space wait time 420*b* is 8.66 seconds.

In row (6), the average free-space wait time 420*b* is 7 seconds.

In row (7), the average free-space wait time 420*b* is 6.5 seconds.

Here, when the average free-space wait time 420*b* can be, with the decimal dropped, rounded down to 12 seconds, the mode configuration management portion 119 selects the recommended mode (A) 411 as in row (1).

When the average free-space wait time 420*b* can be, with the decimal dropped, rounded down to 11 seconds, the mode configuration management portion 119 selects the recommended mode (B) 412 as in row (2).

When the average free-space wait time 420*b* can be, with the decimal dropped, rounded down to 10 seconds, the mode configuration management portion 119 selects the recommended mode (C) 413 as in row (3). The recommended mode (C) 413 is the default mode.

When the average free-space wait time 420*b* can be, with the decimal dropped, rounded down to 9 seconds, the mode configuration management portion 119 selects the recommended mode (D) 414 as in row (4).

When the average free-space wait time 420*b* can be, with the decimal dropped, rounded down to 8 seconds, the mode configuration management portion 119 selects the recommended mode (E) 415 as in row (5).

When the average free-space wait time 420*b* can be, with the decimal dropped, rounded down to 7 seconds, the mode configuration management portion 119 selects the recommended mode (F) 416 as in row (6).

When the average free-space wait time 420*b* can be, with the decimal dropped, rounded down to 6 seconds, the mode configuration management portion 119 selects the recommended mode (G) 417 as in row (7).

The relationship between the average free-space wait time and the recommended mode shown in FIG. 4C is merely an example, and it can be set or changed as necessary. Or, any other recommended mode may be selected. Although FIG. 4C shows seven recommended modes, the number of modes can be six or less or eight or more.

When the mode configuration management portion 119 selects one of the recommended modes (A) to (G) 411 to 417, the memory management portion 118 sets the input portion 115*a*1 and output portion 115*a*2 of the area 115*a* for the printing function as in the mode management table 410 in FIG. 4B.

The mode configuration management portion 119 manages the mode management table 410.

When, referring to the mode management table 410 to find that, for example, the recommended mode (A) 411 is selected, the memory management portion 118 sets the input portion 115*a*1 at 10 MB and sets the output portion 115*a*2 at 15 MB.

When, referring to the mode management table 410 to find that, for example, the recommended mode (B) 412 is selected, the memory management portion 118 sets the input portion 115*a*1 at 11.25 MB and sets the output portion 115*a*2 at 13.75 MB.

When, referring to the mode management table 410 to find that, for example, the recommended mode (C) 413 is selected, the memory management portion 118 sets the input portion 115*a*1 at 12.5 MB and sets the output portion 115*a*2 at 12.5 MB. The recommended mode (C) 413 is the default mode.

When, referring to the mode management table 410 to find that, for example, the recommended mode (D) 414 is selected, the memory management portion 118 sets the input portion 115*a*1 at 13.75 MB and sets the output portion 115*a*2 at 11.25 MB.

When, referring to the mode management table 410 to find that, for example, the recommended mode (E) 415 is selected, the memory management portion 118 sets the input portion 115*a*1 at 15 MB and sets the output portion 115*a*2 at 10 MB.

When, referring to the mode management table 410 to find that, for example, the recommended mode (F) 416 is selected, the memory management portion 118 sets the input portion 115*a*1 at 16.25 MB and sets the output portion 115*a*2 at 8.75 MB.

When, referring to the mode management table 410 to find that, for example, the recommended mode (G) 417 is selected, the memory management portion 118 sets the input portion 115*a*1 at 17.5 MB and sets the output portion 115*a*2 at 7.5 MB.

In this way, the memory management portion 118 sets the sizes of the input portion 115*a*1 and the output portion 115*a*2 of the area 115*a* for the printing function in one of the recommended modes (A) to (G) 411 to 417 reflecting the average free-space wait time 420*b*, and it is thus possible to optimize the sizes of the input portion 115*a*1 and the output portion 115*a*2. This makes it possible to prevent a delay from occurring across one of the dotted-line arrows a to c shown in FIG. 4A.

The plurality of recommended modes shown in FIG. 4B are merely an example, and they can be set or changed as necessary. Common recommended modes are used in FIGS. 4B and 4C. Thus, when the recommended mode is changed in one of FIGS. 4B and 4C, the recommended mode is changed also in the other of FIGS. 4B and 4C.

The sizes of the input portion and the output portion in each recommended mode shown in FIG. 4B are merely an example, and they can be set or changed as necessary.

FIGS. 4A, 4B, and 4C show an example where the sizes of the input portion 115*a*1 and the output portion 115*a*2 of the area 115*a* for the printing function are set. These diagrams do not show the areas 115*b*, 115*c*, and 115*d*. However, the sizes of the input portion and the output portion of the respective areas 115*b*, 115*c*, and 115*d* are set similarly as the sizes of the input portion 115*a*1 and the output portion 115*a*2 of the area 115*a*.

Also for the areas 115*b*, 115*c*, and 115*d*, when one of the allocation modes is selected, the memory management portion 118 sets the sizes of the input portion and the output portion in the default mode.

The default mode can be changed as necessary. For example, the sizes of the input portion and the output portion in the default mode may be different for each of the areas 115*a*, 115*b*, 115*c*, and 115*d*.

The sizes of the input portion and the output portion of the respective areas 115*a*, 115*b*, 115*c*, and 115*d* in the default mode may be different from one allocation mode to another.

FIGS. 4B and 4C show the mode management table 410 and the selection condition management table 420 for the area 115*a* when standard mode is selected. The mode management table and the selection condition management table may be changed as necessary. For example, the mode management table and the selection condition management table may be different from one allocation mode to another. Also, the mode management table and the selection condition management table may be different for each of the areas 115a, 115b, 115c, and 115d.

Figure 5:
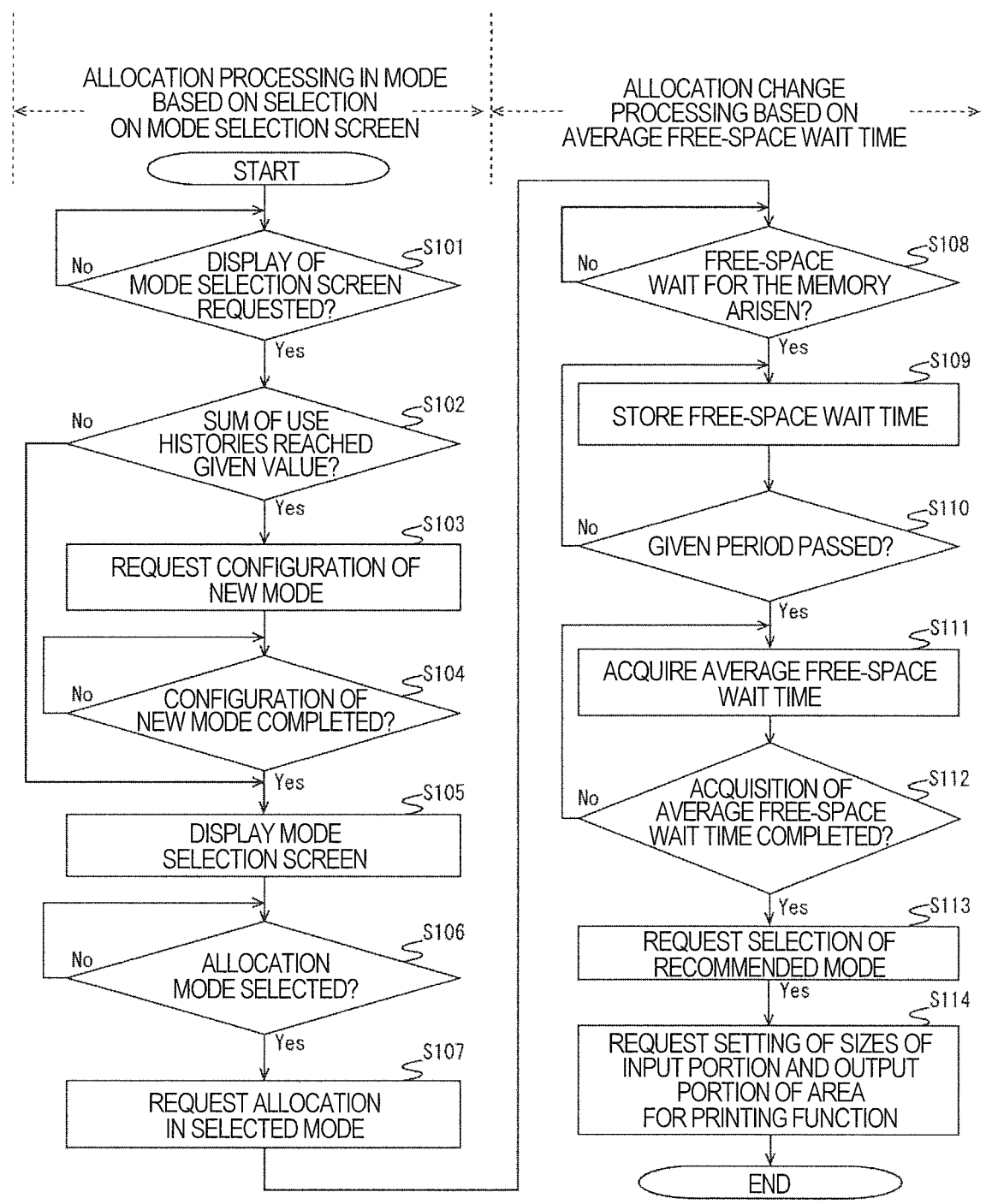
FIG. 5 is a flow chart illustrating processing for changing an area allocated for each function in the memory.

Next, with reference to FIG. 5, a description will be given of change processing for the area allocated for each function in the memory 115 in FIG. 1.

The following description assumes that, when the sum of the use histories of the respective functions reaches, for example, 100, the system control portion 122 requests the mode configuration management portion 119 to configure a new mode.

It is also assumed that the timing at which the system control portion 122 requests the mode configuration management portion 119 to configure a new mode is, for example, when the display of the mode selection screen 105A is requested.

It is also assumed that the use histories of the respective functions are stored in the EEPROM 116.

The following description also assumes that, for convenience of explanation, the target of change processing for the area allocated for each function is the area 115a for the printing function as shown in FIG. 4A.

In the description of steps S107 to S114, it is assumed that the size of the area 115a for the printing function is, for example, 25 MB as shown in FIG. 4A.

Steps S101 to S107 represent allocation processing in the allocation mode based on the selection on the mode selection screen 105A, and steps S108 to S114 represent allocation change processing based on the average free-space wait time.

<Step S101>

In step S101, the system control portion 122 checks whether the display of the mode selection screen 105A has been requested.

The system control portion 122, when there is no notification from the panel operation control portion 120 indicating that an instruction of the display of the mode selection screen 105A has been accepted via the panel portion 105, judges that the display of the mode selection screen 105A is not requested (No in step S101).

By contrast, the system control portion 122, when there is a notification from the panel operation control portion 120 indicating that an instruction of the display of the mode selection screen 105A has been accepted via the panel portion 105, judges that the display of the mode selection screen 105A is requested (Yes in step S101) and the process proceeds to step S102.

<Step S102>

In step S102, the system control portion 122 checks whether the sum of the use histories has reached a given value or not.

When, referring to the use histories stored in the EEPROM 116, the system control portion 122 finds that the sum of the use histories has not reached a given number (for example, 100) (No is step S102), the process proceeds to step S105.

By contrast, when, referring to the use histories stored in the EEPROM 116, the system control portion 122 finds that the sum of the use histories has reached a given number (for example, 100) (Yes is step S102), the process proceeds to step S103.

<Step S103>

In step S103, the system control portion 122 requests the mode configuration management portion 119 to configure a new mode.

The system control portion 122 calculates the use frequencies of the respective areas 115a to 115d of the memory 115 based on the use histories stored in the EEPROM 116 and feeds them to the mode configuration management portion 119.

The system control portion 122, for example, as shown in FIG. 3A, recognizes that the use frequency of the area 115a for the printing function is 40 times, the use frequency of the area 115b for the copying function is 30 times, the use frequency of the area 115c for the FAX function is 16 times, and the use frequency of the area 115d for the scanning function is 14 times.

Figure 3B:
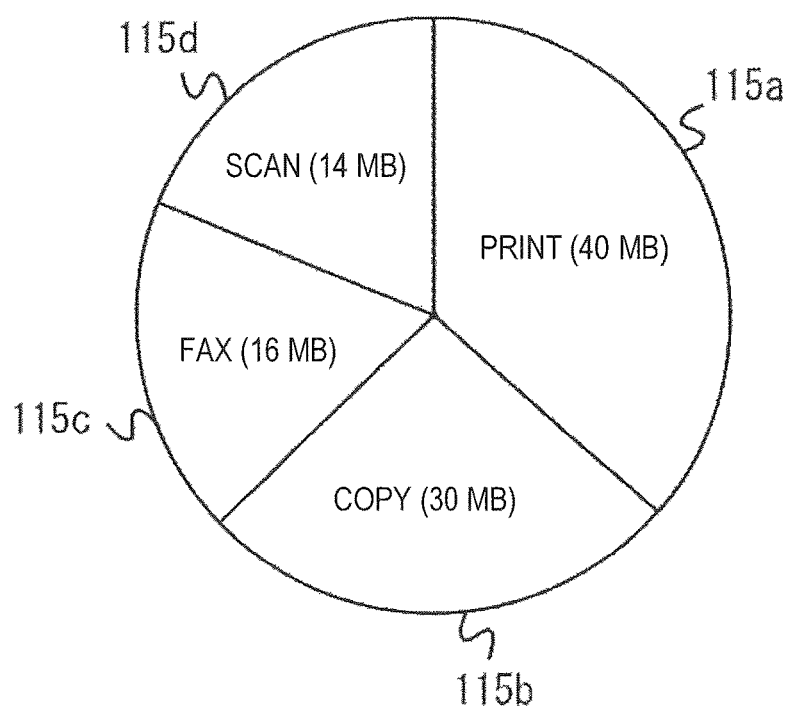
FIG. 3B is a diagram illustrating the configuration of a new mode based on the use frequencies shown in FIG. 3A.

As shown in FIG. 3B, when the size of the memory 115 is, for example, 100 MB, the mode configuration management portion 119, based on the use frequencies of the respective areas 115a to 115d, configures a new mode such that 40 MB is allocated to the area 115a for the printing function, 30 MB is allocated to the area 115b for the copying function, 16 MB is allocated to the area 115c for the FAX function, and 14 MB is allocated to the area 115d for the scanning function. The mode configuration management portion 119, as shown in FIG. 2, manages the configured new mode as, for example, one of modes A to D.

Then, the procedure proceeds to step S104.

<Step S104>

In step S104, the system control portion 122 checks whether the configuration of a new mode has been completed or not.

When there is no notification from the mode configuration management portion 119 indicating that the configuration of a new mode has been completed, the system control portion 122 judges that the configuration of the new mode has not been completed (No in step S104).

By contrast, when there is a notification from the mode configuration management portion 119 indicating that the configuration of a new mode has been completed, the system control portion 122 judges that the configuration of the new mode has been completed (Yes in step S104), and the process proceeds to step S105.

<Step S105>

In step S105, the system control portion 122 has the mode selection screen 105A displayed. That is, the system control portion 122, based on the allocation modes managed by the mode configuration management portion 119, makes the panel portion 105 display the mode selection screen 105A via the panel operation control portion 120. Then, the process proceeds to step S106.

<Step S106>

In step S106, the system control portion 122 checks whether one of the allocation modes has been selected or not.

The system control portion 122, when there is no notification from the panel operation control portion 120 indicating that one of the allocation modes has been selected on the mode selection screen 105A via the panel portion 105, judges that none of the allocation modes has been selected (No in step S106).

By contrast, the system control portion 122, when there is a notification from the panel operation control portion 120 indicating that one of the allocation modes has been selected on the mode selection screen 105A via the panel portion 105, judges that one of the allocation modes has been selected (Yes in step S106), and the process proceeds to step S107.

\<Step S107\>

In step S107, the system control portion 122 requests the memory management portion 118 to perform allocation in the selected allocation mode.

Here, the memory management portion 118, upon receiving an instruction from the system control portion 122 to perform allocation, for example, in mode A shown in FIG. 2, performs allocation of the memory 115 such that 42 MB is allocated to the area 115a for the printing function, 30 MB is allocated to the area 115b for the copying function, 16 MB is allocated to the area 115c for the FAX function, and 12 MB is allocated to the area 115d for the scanning function.

In the processes described above, the mode configuration management portion 119 configures an allocation mode using the use histories of a specific user. Instead, allocation modes for different users may be configured using the use histories of a plurality of users. In this case, the use histories of each user are stored, in association with user identification information such as the user's user ID, in the EEPROM 116, and by using the use histories corresponding to the user identification information accepted when a user logs in the MFP 100, it is possible to configure a mode reflecting the use frequencies of the respective areas 115a to 115d of the memory 115 calculated from the use histories of the user.

The system control portion 122, in step S102 subsequent to the request to display the mode selection screen 105A, makes a request to configure a new mode when the condition that the sum of the use histories has reached a given value is met. Instead, the configuration of a new mode may be requested when any other specific condition is met.

The system control portion 122 can request the configuration of a new mode, for example, when the condition that the power of MFP 100 has shifted from an OFF mode to an ON mode is met. In this case, the mode configuration management portion 119 may configure a new mode based on the use frequencies of the areas 115a to 115d with respect to the sum of the respective use histories of the different functions before the MFP 100 shifted from the ON mode to the OFF mode last time.

The system control portion 122 may request the configuration of a new mode when the condition that, after the passage of a given period last time, another given period has passed is met, that is, for every given period (for example, every month, every three months, or every six months). In this case, the mode configuration management portion 119 may configure a new mode based on the use frequencies of the areas 115a to 115d with respect to the sum of the respective use histories of the different functions during a given period.

Steps S108 to S113 will be described below on the assumption that standard mode is selected in step S107. Also, the area 115a for the printing function will be described specifically. In step S107, the input portion 115a1 and the output portion 115a2 of the area 115a are set in the default mode.

\<Step S108\>

In step S108, the system control portion 122 checks whether a free-space wait for the memory has arisen or not.

When there is no notification from the memory management portion 118 indicating that a free-space wait for the memory has arisen, the system control portion 122 judges that no free-space wait for the memory has arisen (No in step S108).

By contrast, when there is a notification from the memory management portion 118 indicating that a free-space wait for the memory has arisen, the system control portion 122 judges that a free-space wait for the memory has arisen (Yes in step S108), and the process proceeds to step S109.

\<Step S109\>

In step S109, the system control portion 122 makes the mode configuration management portion 119 store the free-space wait time 420a for the area 115a for the printing function for which the free-space wait for the memory has arisen.

Here, the mode configuration management portion 119 registers the free-space wait time 420a in the selection condition management table 420 shown in FIG. 4C. Then, the process proceeds to step S110.

\<Step S110\>

In step S110, the system control portion 122 checks whether a given period has passed or not.

When, referring to an unillustrated calendar function, the system control portion 122 finds that the given period has not passed (No is step S110), the process returns to step S109.

By contrast, when, referring to an unillustrated calendar function, the system control portion 122 finds that the given period has passed (Yes is step S110), the process proceeds to step S111.

\<Step S111\>

In step S111, the system control portion 122 makes the mode configuration management portion 119 acquire the average free-space wait time 420b.

Here, suppose that, in step S109, the free-space wait times 420a are registered, for example, as in row (1) in FIG. 4C; then the mode configuration management portion 119 acquires 12.5 seconds as the average free-space wait time 420b.

Similarly, suppose that the free-space wait times 420a are registered, for example, as in row (2) in FIG. 4C; then the mode configuration management portion 119 acquires 11.66 seconds as the average free-space wait time 420b.

Similarly, suppose that the free-space wait times 420a are registered, for example, as in row (3) in FIG. 4C; then the mode configuration management portion 119 acquires 10 seconds as the average free-space wait time 420b.

Similarly, suppose that the free-space wait times 420a are registered, for example, as in row (4) in FIG. 4C; then the mode configuration management portion 119 acquires 9.66 seconds as the average free-space wait time 420b.

Similarly, suppose that the free-space wait times 420a are registered, for example, as in row (5) in FIG. 4C; then the mode configuration management portion 119 acquires 8.66 seconds as the average free-space wait time 420b.

Similarly, suppose that the free-space wait time 420a is registered, for example, as in row (6) in FIG. 4C; then the mode configuration management portion 119 acquires 7 seconds as the average free-space wait time 420b.

Similarly, suppose that the free-space wait times 420a are registered, for example, as in row (7) in FIG. 4C; then the mode configuration management portion 119 acquires 6.5 seconds as the average free-space wait time 420b.

Then, the process proceeds to step S112.

\<Step S112\>

In step S112, the system control portion 122 checks whether the acquisition of the average free-space wait time 420b has been completed or not.

When there is no notification from the mode configuration management portion 119 indicating that the acquisition of the average free-space wait time 420b has been completed, the system control portion 122 judges that the acquisition of the average free-space wait time 420b has not been completed (No is step S112).

By contrast, when there is a notification from the mode configuration management portion 119 indicating that the acquisition of the average free-space wait time 420b has been completed, the system control portion 122 judges that the acquisition of the average free-space wait time 420b has been completed (Yes is step S112), and the process proceeds to step S113.

<Step S113>

In step S113, the mode configuration management portion 119 selects, based on the average free-space wait time 420b, one of the recommended modes (A) to (G) 411 to 417.

<Step S114>

In step S114, the system control portion 122 requests the memory management portion 118 to set the sizes of the input portion 115a1 and the output portion 115a2 of the area 115a for the printing function.

Here, as described with reference to FIG. 4B, when the mode configuration management portion 119 selects, for example, the recommended mode (A) 411, the memory management portion 118 sets the input portion 115a1 at 10 MB and sets the output portion 115a2 at 15 MB.

When the mode configuration management portion 119 selects, for example, the recommended mode (B) 412, the memory management portion 118 sets the input portion 115a1 at 11.25 MB and sets the output portion 115a2 at 13.75 MB.

When the mode configuration management portion 119 selects, for example, the recommended mode (C) 413, the memory management portion 118 sets the input portion 115a1 at 12.5 MB and sets the output portion 115a2 at 12.5 MB.

When the mode configuration management portion 119 selects, for example, the recommended mode (D) 414, the memory management portion 118 sets the input portion 115a1 at 13.75 MB and sets the output portion 115a2 at 11.25 MB.

When the mode configuration management portion 119 selects, for example, the recommended mode (E) 415, the memory management portion 118 sets the input portion 115a1 at 15 MB and sets the output portion 115a2 at 10 MB.

When the mode configuration management portion 119 selects, for example, the recommended mode (F) 416, the memory management portion 118 sets the input portion 115a1 at 16.25 MB and sets the output portion 115a2 at 8.75 MB.

When the mode configuration management portion 119 selects, for example, the recommended mode (G) 417, the memory management portion 118 sets the input portion 115a1 at 17.5 MB and the output portion 115a2 at 7.5 MB.

In this way, the memory management portion 118 sets, in the manner described above, the sizes of the input portion 115a1 and the output portion 115a2 of the area 115a for the printing function in one of the recommended modes (A) to (G) 411 to 417 reflecting the average free-space wait time 420b, and it is thus possible to optimize the sizes of the input portion 115a1 and the output portion 115a2. It is also possible to prevent a delay from occurring across one of the dotted-line arrows a to c shown in FIG. 4A.

Although the above description deals with a case where standard mode is selected, even in a case where any other allocation mode (one of current mode, mode A, mode B, mode C, and mode D) is selected, the sizes of the input portion 115a1 and the output portion 115a2 can be optimized similarly as in a case where standard mode is selected.

In addition, the area 115a has been described, but the areas 115b, 115c and 115d are not described specifically. However, the sizes of the input portion and the output portion of the respective areas 115b, 115c, and 115d can be optimized similarly as in the area 115a.

The free-space wait time for each of the functions (that is, for each of the areas 115a, 115b, 115c, and 115d) is registered in the selection condition management table. After a given period has passed, the average free-space wait time calculated by averaging the free-space wait time for each of the functions (that is, for each of the areas 115a, 115b, 115c, and 115d) is acquired.

As mentioned previously, the default mode, the mode management table, the selection condition management table, and the like can be changed as necessary.

In this way, in this embodiment, the mode configuration management portion 119 configures an allocation mode indicating the allocation of the areas 115a to 115d based on the use frequencies, for the different functions, of the memory 115. The panel portion 105 displays the mode selection screen 105A, and the memory management portion 118 allocates the areas 115a to 115d to the memory 115 based on the allocation mode selected on the mode selection screen 105A. The memory management portion 118 acquires the free-space wait times 420a for the areas 115a to 115d of the memory 115 for the respective functions in the allocation mode selected on the mode selection screen 105A. The mode configuration management portion 119 manages the recommended modes (A) to (G) 411 to 417 (a plurality of recommended modes) in which the sizes of the input portion and the output portion of the respective areas 115a to 115d allocated to the memory 115 are set according to the average free-space wait times 420b, and selects the recommended mode reflecting the average free-space wait time 420b based on the free-space wait time 420a acquired by the memory management portion 118. Then, the memory management portion 118 sets the sizes of the input portion and the output portion of the respective areas 115a to 115d according to the recommended mode selected by the mode configuration management portion 119.

Here, a description of conventional image forming apparatuses will be given for comparison.

In one known conventional image forming apparatus, one of a plurality of modes is selected, and based on the selected mode, areas suitable for respective functions such as copying, FAX, scanning, and the like are allocated to a memory.

In such conventional image forming apparatuses, according to the selected mode, the allocation of the areas in the memory is fixed. Thus, for example, concentrated use of a specific function may lower job processing performance.

In this case, one possible solution is to expand the area used for the specific function in the memory (that is, the area with a high use frequency). With this, further improvement of job processing performance can be expected.

However, even if the area with a high use frequency in the memory is expanded, a free-space wait for the memory arises depending on what image processing is performed.

In this way, in the conventional image forming apparatuses, inconveniently, even if the area with the high use frequency in the memory is expanded, when a free-space wait arises for the expanded area, job processing performance cannot be further improved.

On the other hand, in this embodiment, it is possible to expand any of the areas 115a to 115d of which the use frequency in the memory 115 is high. Furthermore, when a free-space wait arises for the expanded area, it is possible to change the sizes of the input portion and the output portion of the respective areas 115a to 115d for different functions in the memory 115 according to the average free-space wait times. Thus, it is possible to optimize the respective sizes of the input portion and the output portion of the respective areas 115a to 115d, and this makes it possible to further improve job processing performance.

While the description of this embodiment deals with a case where an electronic device is applied to a MFP100. Instead, it may be applied to any other image forming apparatuses such as printers and multifunction peripherals, or to terminals such as PCs (personal computers) and smartphones.

What is claimed is:

1. An electronic device comprising:

a memory;

a mode configuration management portion which configures a plurality of allocation modes for allocating a plurality of areas to the memory;

a panel portion which displays a mode selection screen for selecting one of the plurality of allocation modes; and a memory management portion which allocates the plurality of areas to the memory based on one of the allocation modes selected on the mode selection screen, wherein the plurality of areas are used for different functions respectively, the memory management portion, after allocating the plurality of areas to the memory based on one of the allocation modes selected on the mode selection screen, acquires free-space wait times for each of the plurality of areas, the mode configuration management portion manages a plurality of recommended modes which set sizes of an input portion and an output portion of each of the plurality of areas allocated to the memory according to average free-space wait times and selects one of the recommended modes for each of the plurality of areas based on the average free-space wait times calculated from the free-space wait times acquired by the memory management portion, and the memory management portion sets the sizes of the input portion and the output portion of each of the plurality of areas according to the recommended mode selected by the mode configuration management portion.

2. The electronic device according to claim 1, wherein the mode configuration management portion registers the free-space wait times acquired by the memory management portion in a selection condition management table for different functions respectively and, after a given period has passed, acquires average free-space wait times for the different functions calculated by averaging the free-space wait times and selects the recommended mode based on the average free-space wait times, and the memory management portion refers to a mode management table which manages the plurality of recommended modes and changes the sizes of the input portion and the output portion of each of the plurality of areas.

3. The electronic device according to claim 1, wherein at least one of the plurality of allocation modes is based on use frequencies, for the different functions, of the memory.

4. A method for controlling a memory in an electronic device, comprising:

configuring, by a mode configuration management portion, a plurality of allocation modes indicating allocation of a plurality of areas in the memory, displaying, by a panel portion, a mode selection screen for selecting one of the plurality of allocation modes, and allocating, by a memory management portion, the plurality of areas to the memory based on one of the allocation modes selected on the mode selection screen, wherein the plurality of areas are used for different functions respectively, the memory management portion, after allocating the plurality of areas to the memory based on one of the allocation modes selected on the mode selection screen, acquires free-space wait times for each of the plurality of areas, the mode configuration management portion manages a plurality of recommended modes which set sizes of an input portion and an output portion of each of the plurality of areas allocated to the memory according to average free-space wait times and selects one of the recommended modes for each of the plurality of areas based on the average free-space wait times calculated from the free-space wait times acquired by the memory management portion, and the memory management portion sets the sizes of the input portion and the output portion of each of the plurality of areas according to the recommended mode selected by the mode configuration management portion.

* * * * *